April 8, 1958    H. W. ROEBER    2,829,782
ARTICLE TRANSFER AND INVERTING MECHANISM
Filed April 20, 1956    5 Sheets-Sheet 1
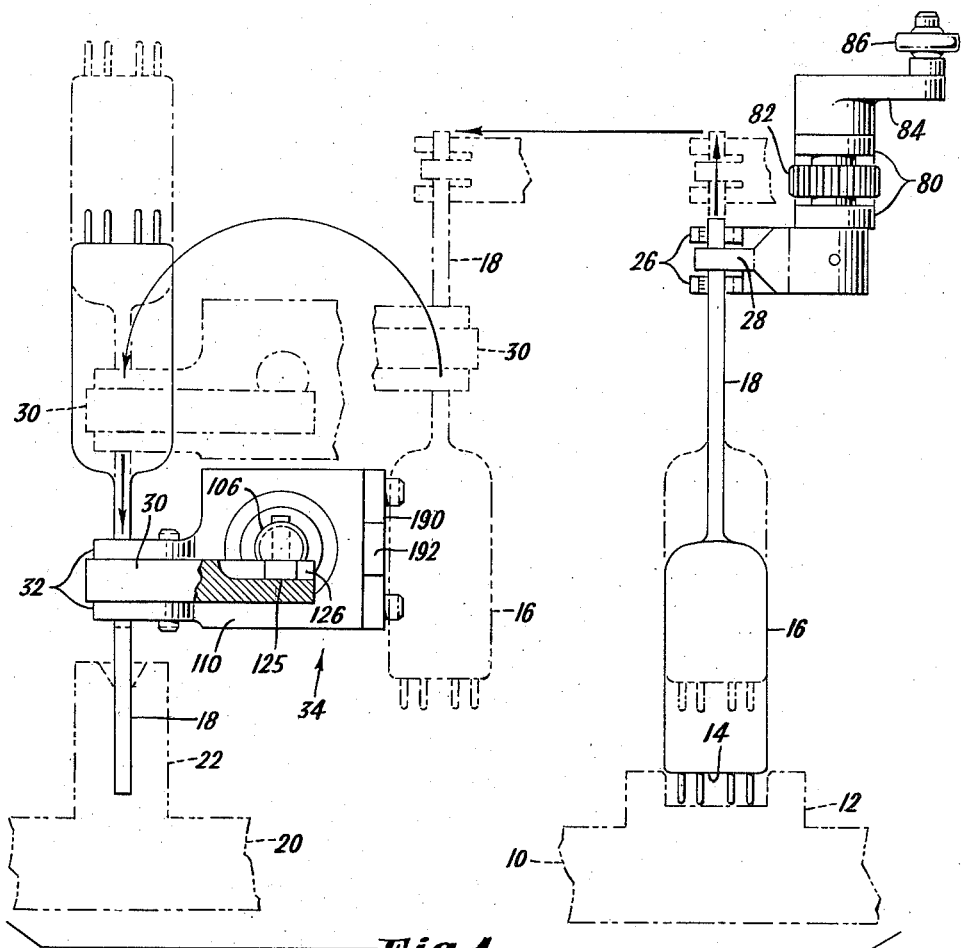
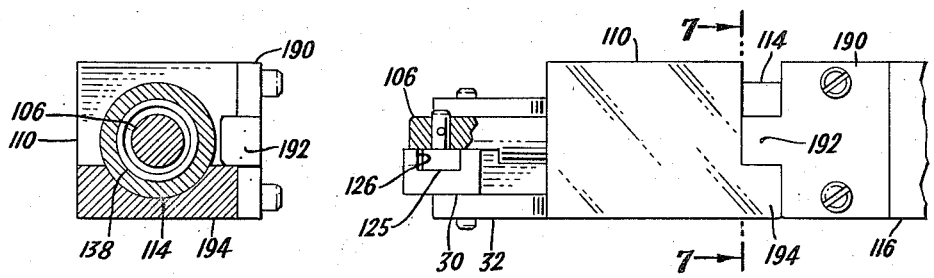
INVENTOR
HENRY W. ROEBER
BY
Michael Hertz
ATTORNEY

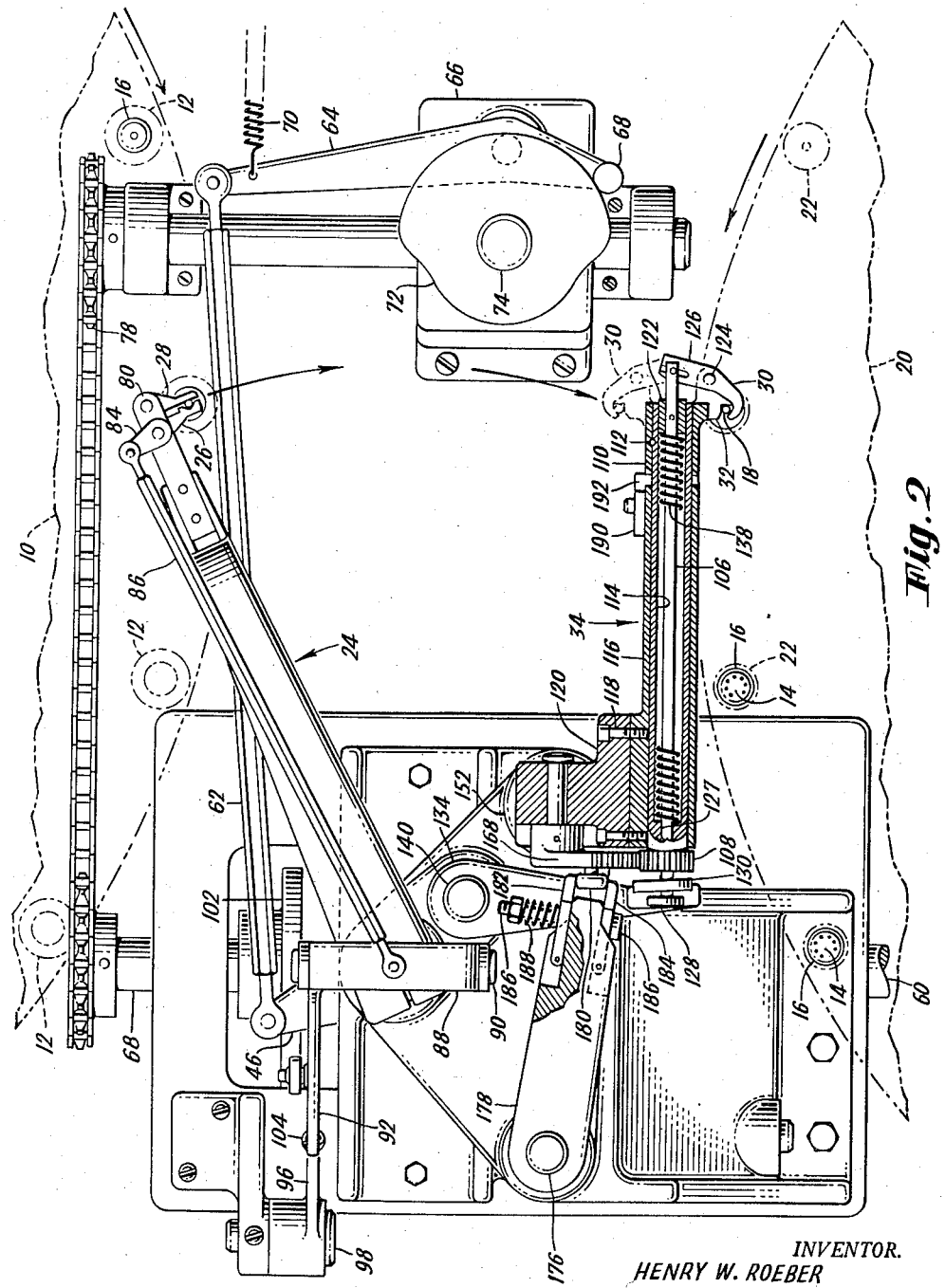

United States Patent Office

2,829,782
Patented Apr. 8, 1958

2,829,782

ARTICLE TRANSFER AND INVERTING MECHANISM

Henry W. Roeber, Emporium, Pa., assignor to Sylvania Electric Products Inc., a corporation of Massachusetts Application April 20, 1956, Serial No. 579,614

5 Claims. (Cl. 214—1)

This invention relates to mechanism for transferring electron tubes from one station to another and inverting the same prior to delivery to said second station.

In particular it relates to the handling of electron tubes between processing operations performed thereon. In the exemplification of the invention the transfer and inverting mechanism is shown as located between two turrets and the article handled is an electron tube in which a tubulated envelope has just been sealed and is ready for exhaust, bombardment and tipping-off, as is well known in the art.

While automatic transfer and inverting mechanism between the sealing peg of a sealing machine and the exhaust port of an exhausting machine is known, the prior art devices had not been satisfactory either because of initial lack of precision in transfer of the tubes from sealer peg to port because of wear of parts soon causing such lack of precision.

Because of such lack of precision, a good many losses of tubes can occur mainly because of breakage of glass tubulation in attempting to insert the tubulation into an exhaust port.

It is, therefore, an object of this invention to provide a transfer and inverting mechanism wherein precision of movement is attained.

It is a further object of the invention to provide such a mechanism with movements in such directions that reasonable wear on parts will not cause misoperation in ultimate positioning of a tubulation in an exhaust port.

How these and other objects are attained will be clear upon considering the following specification when taken in conjunction with the accompanying drawing in which Fig. 1 is an elevational diagrammatic view of the device with parts shown in section illustrating how an electron tube is lifted off the peg of an exhaust turret, transferred to a tube inverting mechanism, inverted, and thrust downwardly into an exhaust port of a tube exhausting machine.

Fig. 2 is a plan view of the transfer and inverting device with parts shown in section.

Fig. 6 is a view, partly in section, illustrating the free end portion of the inverting mechanism, and Fig. 7 is a cross-section along the line 7—7 of Fig. 6.

Figure 3:
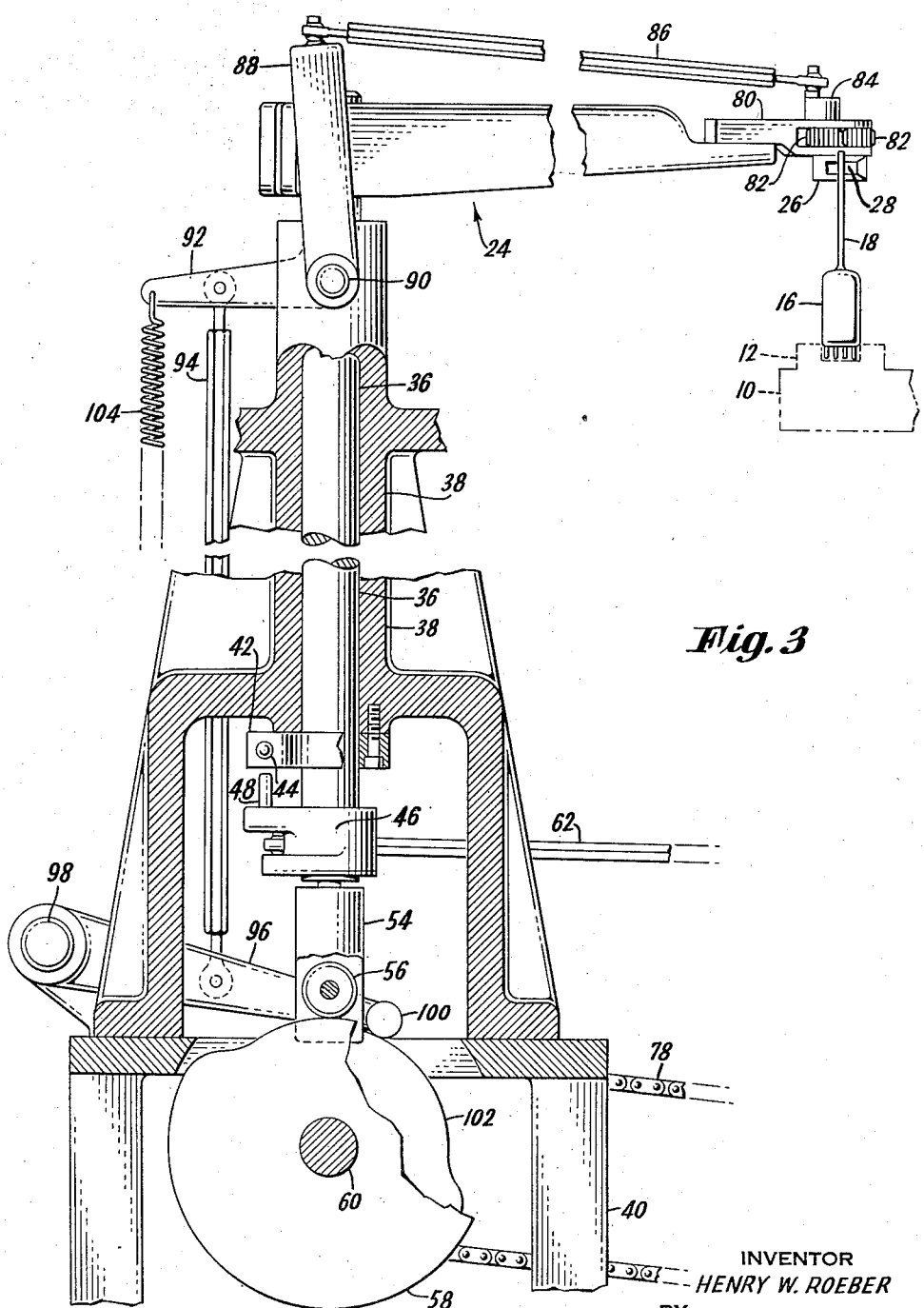
Fig. 3 is an elevation of the transfer mechanism, partly in section, as it appears when removing a tube from off a sealing peg.
Figure 4:
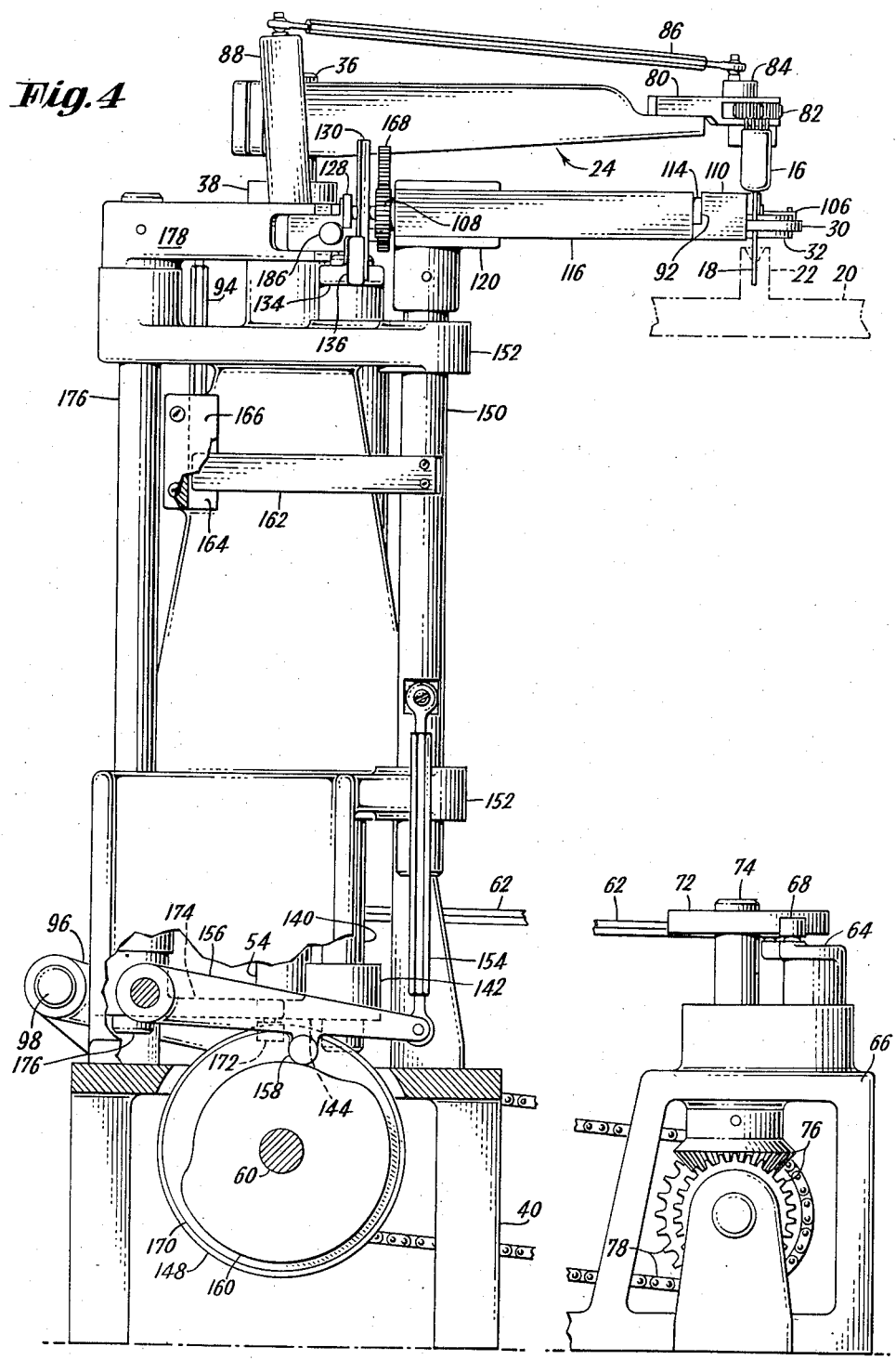
Fig. 4 is a view of the transfer and inverting mechanism as it appears when the inverting mechanism is inserting a tube into an exhaust port.
Figure 5:
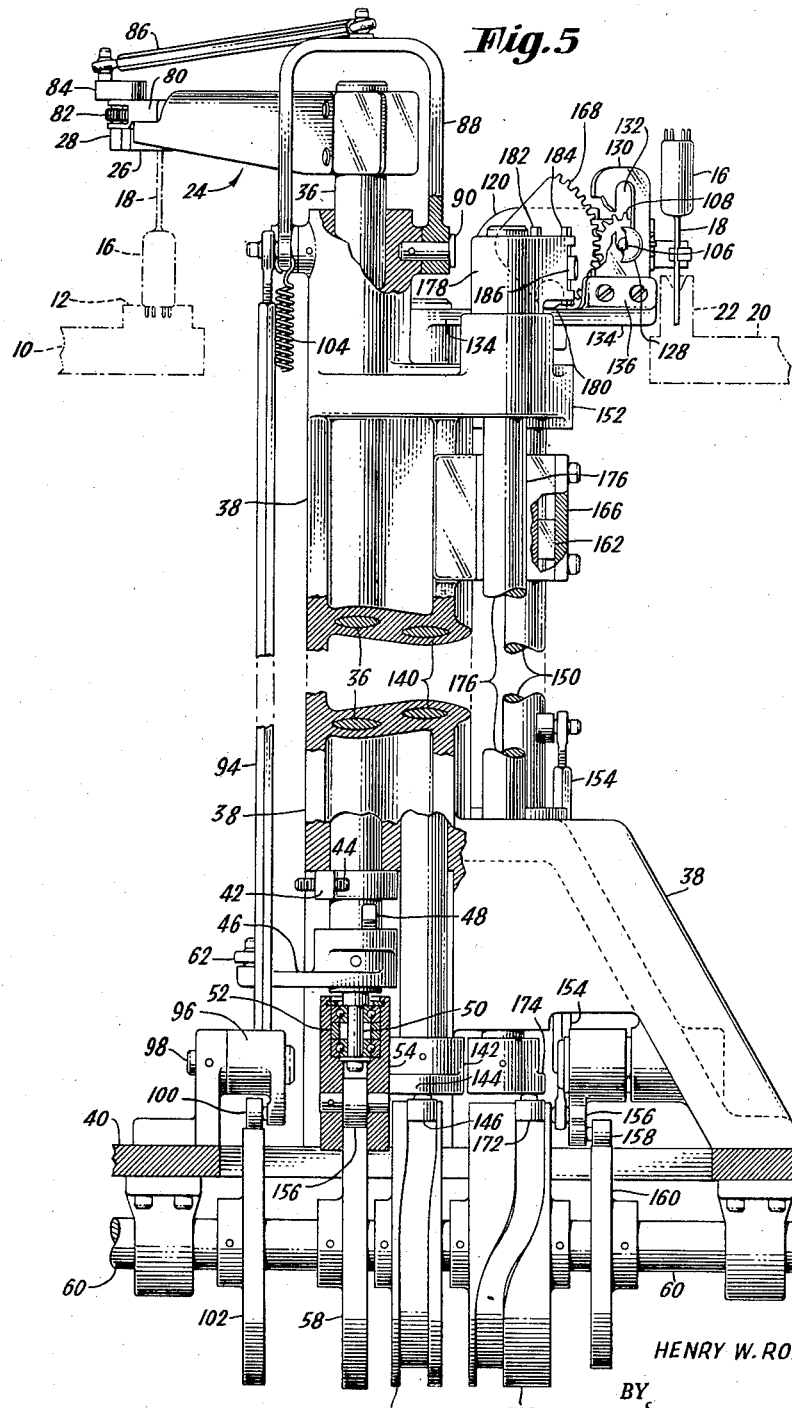
Fig. 5 is a rear elevational view, partly in section, of the transfer and inverting mechanism and showing the drive mechanism therefor.

Now referring to the drawings in greater detail, at 10 there is disclosed an indexible sealing turret carrying equally spaced sealing pegs 12 in a circular array and adjacent the periphery of the sealing turret. On this turret, glass stems 14, carrying mounts, are sealed to glass bulbs 16. These bulbs are provided with long exhaust tubulations 18. A sealed combination of stem, mount and envelope, which may be termed a tube, is transferred from sealing turret 10 to an exhaust turret 20, inverted, and inserted in an exhaust port 22 of turret 20 which is indexed in synchronism with the movement of the sealing turret. The ports in the exhaust turret 20 are also equally spaced and lie on the circumference of a circle, like the sealing pegs of the turret 10.

The transfer mechanism will now be described. The same comprises a swinging arm 24 carrying tubulation grasping jaws 26, 28, at its free end and operative to grasp the tubulation of a bulb, as seen in Fig. 1, and lift the tube off the sealing peg in a straight line motion so as to clear the lead-ins of the tube free of the sealing peg. The arm is then operative to orbitally translate the tube to bring the tubulation into the waiting open jaws 30 and 32 of a tube inverter 34, which also functions to insert the tubulation into a port. The arm 24 is fixedly mounted on the upper end of a vertically reciprocatable and rotationally oscillatable shaft 36 which finds bearing in a vertical casting 38 fixedly mounted on a frame 40 of the machine. The lower end of the shaft passes through a fixed stop ring 42 carrying an abutment stop 44 and fixedly carries a drive arm 46 in which is located a stop pin 48. The lower end of the shaft terminates in a reduced step portion suitably mounted in a roller bearing 52, the roller bearing permitting friction free rotation of the shaft 36 about its vertical axis. The roller bearing is mounted on the upper end of a reciprocatable stub shaft 54 between the lower forked ends of which is mounted an antifriction roller 56 riding on a cam 58, with the forked sides of the stub shaft straddling the cam. The cam is fixed to a main cam shaft 60 geared to the turrets so that all parts are synchronized for movement. The cam in its rotation will raise the shaft and control its lowering movement whereby a tube may be lifted off its sealing peg and the arm 24 may be lowered preparatory to the jaws thereon grasping a new tubulation 18. The oscillation of the shaft 36 is effected via arm 46 suitably pinned to the shaft. The arm is connected by a universal joint to a pitman 62 connected at its other end via a universal joint to a pitman 62 connected at its other end via a universal joint to a lever 64 pivotally mounted intermediate its ends on a standard fixed with reference to the frame 40, the lever being provided at its otherwise free end with a cam follower roller urged by spring 70 against the edge of cam 72 fixed on vertical shaft 74 mounted in bearings in the standard 66 and geared to shaft 60 via conventional bevel gears 76 and conventional chain and sprocket means 78. Rotation of cam 72 and operation of spring 70 cause the shaft 36 to be oscillated, to effect orbital translating movement of the bulb from sealing peg to tube inverter, and to return the arm to position to grasp another tubulation. Means are also provided to open and close the jaws 26 and 28 in proper timed sequence with the movements of the shaft. The jaws are spacedly pivoted in the forked ends of a bar 80 which is adjustable longitudinally of the arm 24 for proper positioning of the jaws with respect to the tubulations to be grasped. Fixed on the pivots and to the jaws, is a pair of intermeshed gears 82, one pivot having affixed thereto an operating arm 84. As the arm 84 is oscillated, the jaws 26 and 28 will move toward each other to grasp a tubulation, as when the end of arm 24 is over a sealing peg, or away from each other to release the tubulation, as when the arm 24 has carried a tubulation to within the jaws 30 and 32 of the inverter 34. To oscillate the arm 84, a jaw operating pitman 86 is pivoted to both arm 84 and a bridge 88 by universal pivots. The bridge loosely straddles the arm 24 and is pivoted on stub shafts 90 at the upper end of the casting 38. The bridge is oscillated by means of an arm 92 integral therewith pivotally connected with a link 94 in turn connected with a lever 96 intermediate its ends, one end of the lever carrying a cam follower roller 100 riding on a cam 102 fastened on cam shaft 60. A spring 104 between arm 92 and the frame serves to maintain the roller 100 against its cam.

The tube inverter and tubulation-into-port inserting mechanism 34 will now be described. This mechanism includes the pair of jaws 30 and 32, mechanism for moving one of the jaws to receive a tubulation when the arm 24 swings over to the inverter, mechanism including a rack driven pinion 108 to rotate the jaws to invert a held tube, and mechanism to subsequently move the inverter to move the jaws 30 and 32 in a right line motion toward and from the port 22 to thrust a tubulation into the port and to move away therefrom again, the jaws releasing the tubulation prior to withdrawal of the jaws in a right line motion from a port.

When the arm 24 approaches the inverter, the jaws are in a position 180° rotated from that shown in full lines in Fig. 2, with the jaw 30 withdrawn from jaw 32 to allow entry of the tubulation 18 into the recess provided in jaw 32. Jaw 32 is integral with the end of a block 110 which in turn is pinned, as by pin 112, to a sleeve 114 rotatable within a long bearing 116 fastened by screws 118 to a vertically reciprocatable head 120. The sleeve 114 at one end has affixed to it the block 110, as well as a ring 122. This ring is also pinned to rod 106. The jaw 32 has mounted therein a pivot pin 124 to pivotally mount the jaw 30, the tail end of the jaw 30 being driven from the rod 106 by an antifriction roller 125 mounted on the rod riding in a slot 126 in the tail of jaw 30. The end of rod 106 opposite to its connection with the jaw 30 passes through a bearing 127 within the sleeve and is provided with a button 128 on its end. Said button is adapted to be engaged by a face of vertical plate 130 slotted vertically as at 132 to enable the rod 106 to be displaced laterally upward as will be later described. The plate 130 is mounted on a swingable arm 134 as by being screwed to a web 136 extending upward from the arm. Swinging of the arm clockwise, as viewed in Fig. 2, causes the plate to engage the button 128 to effect movement of the rod 106 in a direction to move the free end of jaw 30 away from jaw 32. A spring 138 compressed between the bearing portion 127 and the ring 122 effects return of the jaws to closed position as the arm 134 is moved in a counterclockwise direction, the arm having free travel beyond the closed position of the jaws. The arm 134 is mounted on a vertical shaft 140 finding bearing in the casting 38. On the lower end of shaft 140 is pinned a collar 142 having an arm 144 carrying a roller 146 riding in a barrel cam 148 fixed on shaft 60. Oscillation of the arm 144 by the cam 148 will cause the shaft to oscillate to open the jaws and will permit the spring 138 to close the jaws.

The means for rotating the jaws 30, 32 comprise the wide toothed pinion 108 fixed on the rod 106, a segmental rack 168 and means to operate the rack. The teeth on pinion 108 are wide enough to be engaged with the rack in any shifted position of rod 106. The rack may be operated in any vertical position of the head 120, as will be described. To operate the rack there is provided a barrel cam 170 operating on a roller 172 mounted on an arm 174 having a collar portion pinned to a vertical oscillatable shaft 176 mounted in bearings fixed with reference to the casting. Secured to the top of shaft 176 is an arm 178 extending toward the segmental rack and having a drive connected therewith. The rack has fixed on it an antifriction roller 180 and the arm 178 has pivoted thereon two cheek plates 182 and 184. These plates are held spring pressed against the roller 180 by a bolt 186 having a head pressing against plate 184 and a spring 188 reacting between the plate 182 and a nut on the bolt. As the arm swings, the cheeks will drive the roller 180 and the segmental gear 168 to cause oscillation of the jaws 30, 32 from full line position and to dotted line position and back, as shown in Fig. 2, the spring 188 and pivoted plates allowing for overdrive of the arm 178. The rack and sleeve 114 carrying the jaws are limited in their oscillation by a stop 190 fastened on the bearing 116, said stop having a lug 192 engaging a projection 194 extending from the block 110, the projection having a dimension, as seen in Fig. 6, sufficient to stop the jaws in horizontal position in either of the 180° swung positions of the jaws. The resilient drive provided by the cheeks and the stop element organization provide for full 180° rotation of the jaws at any height of the head 120. As will be seen in Fig. 1, in the dotted line position of the jaws 30, 32, the jaws are at a high elevation, and are timed to engage the tubulation prior to the release of the tubulation by the transfer jaws 26, 28. The jaws are then rotated through 180° to bring the tubulation over a port 22, then the jaws are lowered to the full line position to force the tubulation 18 into the port, after which the jaw 30 is opened, the turret 20 indexed and the jaws raised and swung to the tubulation receiving position. It will be noted that the opening from the jaws 30 and 32 face the direction in which turret 20 is indexing so that when jaw 30 is open, there is no restriction to movement of the tube in the port. In the case of the sealing turret, the jaws 26, 28 are geared together so that jaw 28 is out of the way of the approaching movement of the tubulation, the jaws being closed on the tubulation after indexing movement of the turret.

Having thus described the invention, what is claimed as new is:

1. A grasping, inverting, and translating mechanism comprising a head, a bearing carried by said head, a sleeve carried by said bearing, a rod in said sleeve, a jaw fixedly mounted on said sleeve, a cooperating jaw pivotally mounted on said first jaw and pivotally and slidably connected with one end of said rod, a spring urging said jaws to closed position, means for raising and lowering the head and parts carried thereby, means for opening said jaws comprising an enlargement on the other end of said rod, a plate opposite said enlargement, means for moving said plate toward the enlargement to open the jaws, and means for rotating the sleeve whereby the jaws are rotated, said means comprising a pinion on said sleeve, an oscillatory rack in engagement with said pinion, a pin on said rack, an oscillatory arm having a pair of spring pressed plates on the end thereof engaging with said pin, a lug fixed on said bearing, and a projection rotatable with said sleeve engageable with said lug on rotation of said sleeve.

2. A grasping, inverting, and translating mechanism comprising a head, a bearing carried by said head, a sleeve carried by said bearing, a rod in said sleeve, a jaw fixedly mounted on said sleeve, a cooperating jaw pivotally mounted on said first jaw and pivotally and slidably connected with one end of said rod, a spring urging said jaws to closed position, means for raising and lowering the head and parts carried thereby, means for opening said jaws comprising an enlargement on the other end of said rod, a plate opposite said enlargement, means for moving said plate toward the enlargement to open the jaws, and means for rotating the sleeve whereby the jaws are rotated.

3. An article transfer and inverting mechanism comprising a first swinging arm, a first pair of transfer jaws at the free end of the arm adapted to grasp an article when closed, a second arm with a second pair of open inverter jaws in the path of movement of an article carried by said transfer jaws, means to close the inverter jaws when an article is positioned between said jaws by said transfer jaws, means to open the transfer jaws when the article is grasped by the inverter jaws, means to invert the inverter jaws and means to swing the first arm and to reciprocate both of said arms vertically.

4. An article transfer and inverting mechanism comprising a first swinging arm movable in a horizontal plane, a first pair of transfer jaws at the free end of the arm adapted to grasp an article at one end of the swinging movement of the arm and translate it to the other end of the swinging movement of the arm, a second arm with a second pair of open inverter jaws in the path of movement of an article carried by the transfer jaws, means to open and close both pairs of jaws, means to swing the first arm, means to invert the article carried by the second jaws and to transfer the article from a position on one side of the arm to a position on the other side of the arm, and means to vertically reciprocate both arms.

5. An article transfer and inverting mechanism for removing articles sequentially from one horizontal conveyor and placing them on a second horizontal conveyor comprising a vertically reciprocatable and swingable arm whose free end swings over the first conveyor, article grasping jaws at the free end of said arm, a second non-swingable but vertically reciprocatable arm carrying at its free end a pair of article inverting jaws with said jaws in one of the inverted positions lying in the path of movement of an article carried by the grasping jaws, said inverting jaws in another of its positions being above the second conveyor, means to operate both the grasping and inverting jaws, the swinging motion of the first arm and the vertical reciprocating motion of both arms.

References Cited in the file of this patent
UNITED STATES PATENTS

| | | |
|---|---|---|
| 1,401,429 | Moone | Dec. 27, 1921 |
| 1,811,832 | Mayers | June 23, 1931 |
| 1,958,846 | Christensen | May 15, 1934 |
| 2,259,728 | Bridges | Oct. 21, 1941 |
| 2,661,101 | Mullan | Dec. 1, 1953 |